(12) United States Patent
Sharma et al.

(10) Patent No.: US 12,407,591 B2
(45) Date of Patent: Sep. 2, 2025

(54) CENTRALIZED MONITORING OF CONTAINERIZED WORKLOADS IN A MULTI-TENANT, MULTI-CLOUD ENVIRONMENT

(71) Applicant: VMware LLC, Palo Alto, CA (US)

(72) Inventors: Avi Sharma, Neemuch (IN); Srinivas Banoth, Hyderabad (IN); Nilabh Nikunj, Bangalore (IN); Gyanendra Pratap Singh, Bangalore (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/607,374

(22) Filed: Mar. 15, 2024

(65) Prior Publication Data
US 2025/0119368 A1 Apr. 10, 2025

(30) Foreign Application Priority Data
Oct. 6, 2023 (IN) .............................. 202341067125

(51) Int. Cl.
| | | |
|---|---|---|
| *H04L 41/0813* | (2022.01) | |
| *H04L 41/0853* | (2022.01) | |
| *H04L 41/0894* | (2022.01) | |
| *H04L 41/5054* | (2022.01) | |
| *H04L 43/08* | (2022.01) | |

(52) U.S. Cl.
CPC .......... *H04L 43/08* (2013.01); *H04L 41/0894* (2022.05)

(58) Field of Classification Search
CPC . H04L 41/0894; H04L 43/08; H04L 41/0813; H04L 41/5054; H04L 41/0853
USPC .......................................................... 709/224
See application file for complete search history.

(56) References Cited

U.S. PATENT DOCUMENTS

| | | | |
|---|---|---|---|
| 11,876,691 B2 * | 1/2024 | Chang | H04L 43/028 |
| 2018/0074724 A1 * | 3/2018 | Tremblay | G06F 3/0689 |
| 2019/0028300 A1 * | 1/2019 | Mathew | H04L 43/20 |
| 2024/0323087 A1 * | 9/2024 | Koyfman | G06F 8/60 |

* cited by examiner

*Primary Examiner* — Jude Jean Gilles
(74) *Attorney, Agent, or Firm* — King Intellectual Asset Management

(57) ABSTRACT

The disclosure provides a method for monitoring tenant workloads in a multi-cloud environment. The method generally includes determining a first new workload for a first tenant is deployed on a first data plane associated with a first cloud platform in the multi-cloud environment; configuring a monitoring stack on a second data plane associated with a second cloud platform in the multi-cloud environment to collect first metrics data for the first new workload; and creating a network policy allow list including a source internet protocol (IP) address associated with the monitoring stack, wherein the network policy allow list is to be used by an ingress controller deployed on the first data plane to control ingress traffic to the first new workload, including at least ingress traffic from the monitoring stack intended for the first new workload.

20 Claims, 5 Drawing Sheets

CENTRALIZED MONITORING OF CONTAINERIZED WORKLOADS IN A MULTI-TENANT, MULTI-CLOUD ENVIRONMENT

CROSS-REFERENCES

This application claims the benefit of Indian Patent Application number 202341067125, entitled "CENTRALIZED MONITORING OF CONTAINERIZED WORKLOADS IN A MULTI-TENANT, MULTI-CLOUD ENVIRONMENT," filed on Oct. 6, 2023, of which is hereby incorporated by reference in its entirety.

BACKGROUND

Modern applications are applications designed to take advantage of the benefits of modern computing platforms and infrastructure. For example, modern applications can be deployed in a multi-cloud or hybrid cloud fashion. A multi-cloud application may be deployed across multiple clouds, which may be multiple public clouds provided by different cloud providers or the same cloud provider or a mix of public and private clouds. The term, "private cloud" refers to one or more on-premises data centers that may have pooled resources allocated in a cloud-like manner. Hybrid cloud refers specifically to a combination of public cloud and private clouds. Thus, an application deployed across a hybrid cloud environment consumes both cloud services executing in a public cloud and local services executing in a private data center (e.g., a private cloud).

Within each public cloud or private cloud, modern applications can be deployed onto one or more virtual machines (VMs), containers, and/or the like. A container is a package that relies on virtual isolation to deploy and run applications that depend on a shared operating system (OS) kernel. Containerized applications (also referred to as "containerized workloads"), can include a collection of one or more related applications packaged into one or more containers. In some orchestration systems, a set of one or more related containers sharing storage and network resources, referred to as a pod, are deployed as a unit of computing software. Container orchestration systems automate the lifecycle of containers, including such operations as provisioning, deployment, monitoring, scaling (up and down), networking, and load balancing.

Kubernetes® (K8S®) software is an example open-source container orchestration platform that automates the operation of such containerized applications. In particular, Kubernetes may be used to create a cluster of interconnected nodes, including (1) one or more worker nodes that run the containerized applications (e.g., in a worker plane) and (2) one or more control plane nodes (e.g., in a control plane) having control plane components running thereon that control the cluster. Control plane components make global decisions about the cluster (e.g., scheduling), and can detect and respond to cluster events (e.g., starting up a new pod when a workload deployment's intended replication is unsatisfied, etc.). As used herein, a node may be a physical machine, or a VM configured to run on a physical machine running a hypervisor. Kubernetes software allows for distributed computing by running the pods of containerized workloads on a cluster of interconnected worker nodes (e.g., VMs or physical machines) that may scale vertically and/or horizontally over hybrid cloud topology.

Multi-cloud infrastructure offers many benefits, including the ability to dynamically and quickly scale, as well as increase reliability across workloads. However, monitoring of these workloads across different cloud infrastructures is challenging. In particular, monitoring helps with the proactive management of cloud-native workloads, eases management of containerized infrastructure by tracking utilization of cluster resources including memory, central processing unit (CPU), and/or storage, and enables users (e.g., cluster administrators) to identify issues such as insufficient resources, failures, poor workload performance and/or the like, such that mitigating action can be taken, to name a few.

Monitoring of cloud-native workloads generally involves the use of (1) workload(s) that expose workload metrics (e.g., resource utilization, workload performance, etc.), (2) scraping tool(s) for collecting workload metrics from the workload(s) to generate a data-model representation, and (3) a visualizer tool that enables users to configure alarm(s), generate visualization(s) (e.g., customized dashboards, charts, etc.), and/or perform other functions based on the generated data-model representation. Networking between each of these components may be necessary to carry out such monitoring.

Workload(s) deployed in different cloud infrastructure may use different sets of networking features, however. Each cloud may also be managed by individual local users through native cloud consoles, making the adoption of unified policies across the multi-cloud environment, for communicating workload metrics between the different components, difficult. As such, this decentralized network infrastructure poses operational challenges and adds complexities to monitoring workloads and their metrics in multi-cloud infrastructure.

As such, some multi-cloud implementations deploy at least one workload, scraping tool, and visualizer tool per cloud. For example, a first scraping tool may be deployed in a first cloud of a multi-cloud environment and configured to obtain metrics from a first workload running in the first cloud to generate a first data representation for the first workload. The first data representation may be used by a first visualizer tool of the first cloud. Further, a second scraping tool may be deployed in a second cloud of the multi-cloud environment and configured to obtain metrics from a second workload running in the second cloud to generate a second data representation for the second workload. The second data representation may be used by a second visualizer tool of the second cloud. The first workload, the first scraping tool, and the first visualizer tool may not communicate with the second workload, the second scraping tool, or the second visualizer tool, and vice versa. This distributed system, while able to monitor workloads, requires separate hardware and network policies for each cloud location, leading to higher upfront costs and ongoing maintenance overhead. Further, a centralized view of workload metrics collected for workloads deployed across different clouds may not be feasible due to the lack of networking between different cloud components. As such, less visibility of workload performance and resource usage across the multi-cloud environment may be provided.

Further challenges with workload monitoring involve cases where multiple tenants (e.g., individual users or customers, groups of users or customers, a department, or a company that purchase cloud computing resources) run their containerized workloads in a same networking environment of the multi-cloud infrastructure. For security purposes, the containerized workloads of different tenants may need to be network isolated from one another within the networking environment. Further, isolation between metrics data of various tenants may need to be guaranteed.

SUMMARY

One or more embodiments provide a method for monitoring tenant workloads in a multi-cloud environment. The method generally includes determining a first new workload for a first tenant is deployed on a first data plane associated with a first cloud platform in the multi-cloud environment. The method generally includes configuring a monitoring stack on a second data plane associated with a second cloud platform in the multi-cloud environment to collect first metrics data for the first new workload. Further, the method generally includes creating a network policy allow list including a source internet protocol (IP) address associated with the monitoring stack. The network policy allow list may be used by an ingress controller deployed on the first data plane to control ingress traffic to the first new workload, including at least ingress traffic from the monitoring stack intended for the first new workload.

Further embodiments include a non-transitory computer-readable storage medium comprising instructions that cause a computer system to carry out the above methods, as well as a computer system configured to carry out the above methods.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
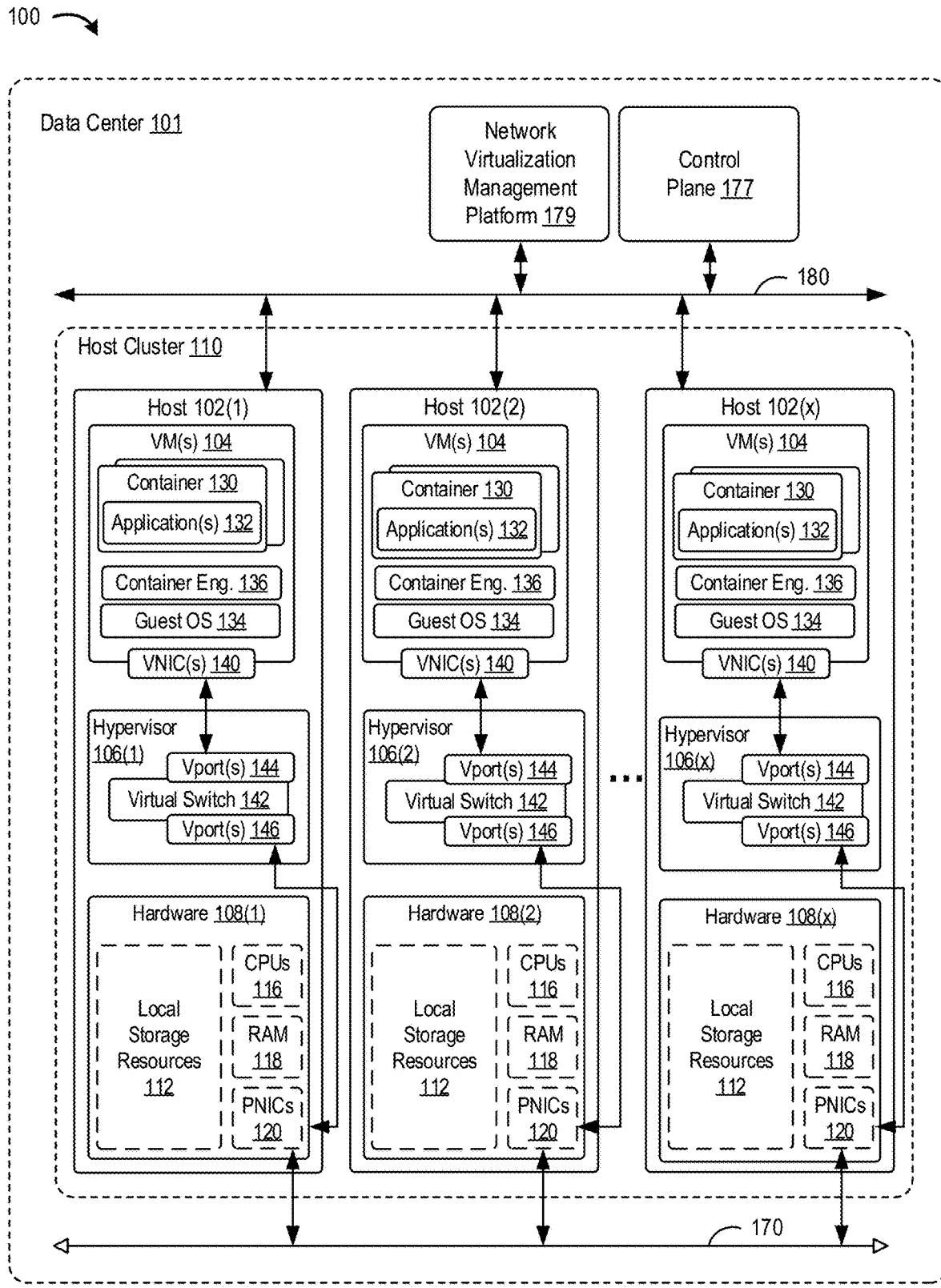
FIG. 1A depicts example physical and virtual network components in a networking environment in which embodiments of the present disclosure may be implemented.

Techniques for centralized monitoring of containerized workloads in a multi-tenant, multi-cloud environment are described herein. For example, a container-based cluster (e.g., such as Kubernetes) deployed and running on each cloud platform in the multi-cloud environment may be used to execute tenant workload(s). Thus, one tenant's workloads may be spread across various cloud platforms. A centralized monitoring stack (simply referred to herein as a "monitoring stack") may be deployed on a single cloud platform in the multi-cloud environment to actively monitor the tenant's workloads across the various cloud platforms (e.g., one monitoring stack per tenant). More specifically, the monitoring stack may be configured to collect and generate a visualization of metrics data associated with the tenant's workloads deployed on different cloud platforms. As described below with respect to FIGS. 2 and 3, network address translation (NAT) may be used to allow the centralized monitoring stack to address tenant workloads outside of the cloud platform where the monitoring stack is deployed, to obtain such metrics data. Further, an ingress controller may be provided on each of the cloud platforms where the tenant's workload(s) are running to control access to the workload(s)' metrics. For example, an ingress controller deployed on a first cloud platform may allow ingress traffic to a workload also deployed on the first cloud platform from a monitoring stack, deployed on a second cloud platform, based on an internet protocol (IP) address associated with the monitoring stack being included in a network policy allow list maintained by the ingress controller.

To help ensure that all workloads are accessible and are being monitored in the multi-cloud environment, especially in environments where new workloads are constantly added and/or deleted for new and/or existing tenants, embodiments herein further deploy (1) a controller service and (2) a monitoring service per cloud platform. Each monitoring service is responsible for determining a current state of workload(s) running on a cloud platform where the respective monitoring service is deployed and providing information about this current state to the controller service. The controller service may use information about the current state (and previous state(s)) of the workload(s) to track when a cluster event has occurred. The cluster event may include the creation and/or deletion of one or more workloads, for one or more tenants, on a particular cloud platform. The controller service may be configured to perform various actions, such as (1) deploying or deleting a new monitoring stack, (2) updating a configuration of an existing monitoring stack, and/or (3) creating, deleting, or updating a network policy, based on the type of cluster event that occurred to enable consistent monitoring, and security, for tenant workload(s) in the multi-cloud environment.

As such, techniques described herein provide a system enabled for secure centralized monitoring of all workload metrics for a tenant. Further, the system is able to keep track of changes happening across different cloud platforms such that monitoring configurations and/or network policies are updated automatically and appropriately to allow for continuous monitoring and isolation of metrics data for various tenants.

FIG. 1A depicts example physical and virtual network components in a networking environment 100 in which embodiments of the present disclosure may be implemented. Networking environment 100 includes a data center 101. Data center 101 includes one or more hosts 102, a management network 180, a data network 170, a network virtualization management platform 179, and a control plane 177.

Host(s) 102 may be communicatively connected to management network 180 and data network 170. Data network 170 and management network 180 enables communication between hosts 102, and/or between other components and hosts 102.

Data network 170 and management network 180 may be separate physical networks or may be logically isolated using a single physical network and separate VLANs or logical overlay networks, or a combination thereof. As used herein, the term "underlay" may be synonymous with "physical" and refers to physical components of networking environment 100. As used herein, the term "overlay" may be used synonymously with "logical" and refers to the logical network implemented at least partially within networking environment 100.

Host(s) 102 may be geographically co-located servers on the same rack or on different racks in any arbitrary location in the data center. Host(s) 102 may be in a single host cluster or logically divided into a plurality of host clusters. Each host 102 may be configured to provide a virtualization layer, also referred to as a hypervisor 106, that abstracts processor, memory, storage, and networking resources of a hardware platform 108 of each host 102 into multiple VMs 1041 to 104N (collectively referred to as VMs 104 and individually referred to as VM 104) that run concurrently on the same host 102.

Host(s) 102 may be constructed on a server grade hardware platform 108, such as an x86 architecture platform. Hardware platform 108 of each host 102 includes components of a computing device such as one or more processors (central processing units (CPUs)) 116, memory (random access memory (RAM)) 118, one or more network interfaces (e.g., physical network interfaces (PNICs) 120), storage 112, and other components (not shown). CPU 116 is configured to execute instructions that may be stored in memory 118, and optionally in storage 112. The network interface(s) enable hosts 102 to communicate with other devices via a physical network, such as management network 180 and data network 170.

In certain embodiments, hypervisor 106 runs in conjunction with an operating system (OS) (not shown) in host 102. In some embodiments, hypervisor 106 can be installed as system level software directly on hardware platform 108 of host 102 (often referred to as "bare metal" installation) and be conceptually interposed between the physical hardware and the guest operating systems executing in the VMs 104. It is noted that the term "operating system," as used herein, may refer to a hypervisor.

Each of VMs 104 running on each host 102 may include virtual interfaces, often referred to as virtual network interfaces (VNICs), such as VNICs 140, which are responsible for exchanging packets between VMs 104 and hypervisor 106, such as with a virtual switch 142 running in the hypervisor 106. The virtual switch on each host operates as a managed edge switch implemented in software by a hypervisor on each host. Virtual switches provide packet forwarding and networking capabilities to VMs running on the host. VNICs 140 can connect to Vports 144, provided by virtual switch 142. In this context "connect to" refers to the capability of conveying network traffic, such as individual network packets, or packet descriptors, pointers, identifiers, etc., between components so as to effectuate a virtual datapath between software components. Virtual switch 142 also has Vport(s) 146 connected to PNIC(s) 120, such as to allow VMs 104 (and containers 130 running in VMs 104, as described below) to communicate with virtual or physical computing devices outside of host 102 via data network 170 and/or management network 180.

Further, each of VMs 104 implements a virtual hardware platform that supports the installation of a guest OS 134 which is capable of executing one or more applications 132. Guest OS 134 may be a standard, commodity operating system. Examples of a guest OS include Microsoft Windows, Linux, and/or the like. Applications 132 may be any software program, such as a word processing program.

Network virtualization management platform 179 is a physical or virtual server that orchestrates a software-defined network layer. A software-defined network layer includes logical network services executing on virtualized infrastructure (e.g., of hosts 102). The virtualized infrastructure that supports logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches and logical routers, as well as logical firewalls, logical virtual private networks (VPNs), logical load balancers, and the like, implemented on top of the virtualized infrastructure.

In certain embodiments, network virtualization management platform 179 includes one or more virtual servers deployed as VMs. In certain embodiments, network virtualization management platform 179 installs agents in hypervisor 106 to add a host 102 as a managed entity, referred to as an edge transport node. An edge transport node may be a gateway (e.g., implemented by a router) between the internal logical networking of hosts 102 and an external network. Data Center 101 also includes physical network devices (e.g., physical routers/switches), which are not explicitly shown in FIG. 1.

One example of a software-defined networking platform that can be configured and used in embodiments described herein as network virtualization management platform 179 and the software-defined network layer is a VMware NSX® platform made commercially available by VMware, Inc. of Palo Alto, California.

In certain embodiments, data center 101 includes a container orchestrator that implements an orchestration control plane 177 (also referred to herein as "control plane 177"), such as a Kubernetes control plane, to deploy and manage applications 132 and/or services thereof on hosts 102, of a host cluster 110, using containers 130. In particular, each VM 104 includes a container engine 136 installed therein and running as a guest application under control of guest OS 134. Container engine 136 is a process that enables the deployment and management of virtual instances, referred to herein as "containers," in conjunction with OS-level virtualization on guest OS 134 within VM 104 and the container orchestrator. Containers 130 provide isolation for user-space processes executing within them. Containers 130 encapsulate an application 132 (and its associated workloads) as a single executable package of software that bundles application code together with all of the related configuration files, libraries, and dependencies required for it to run.

Control plane 177 runs on a cluster of hosts 102 and may deploy containerized applications as containers 130 on the cluster of hosts 102. Control plane 177 manages the computation, storage, and memory resources to run containers 130 in the host cluster. Further, control plane 177 supports the deployment and management of applications (and their associated workloads) in the container-based cluster using containers 130. In certain embodiments, hypervisor 106 is integrated with control plane 177 to provide a "supervisor cluster" (i.e., management cluster) that uses VMs 104 to implement both control plane nodes and compute objects managed by control plane 177 (e.g., Kubernetes control plane).

In certain embodiments, control plane 177 deploys workloads of applications 132 as pods of containers running on hosts 102, either within VMs 104 or directly on an OS of hosts 102. A pod is a group of one or more containers 130 and a specification for how to run the containers 130. A pod may be the smallest deployable unit of computing that can be created and managed by control plane 177.

Figure 1B:
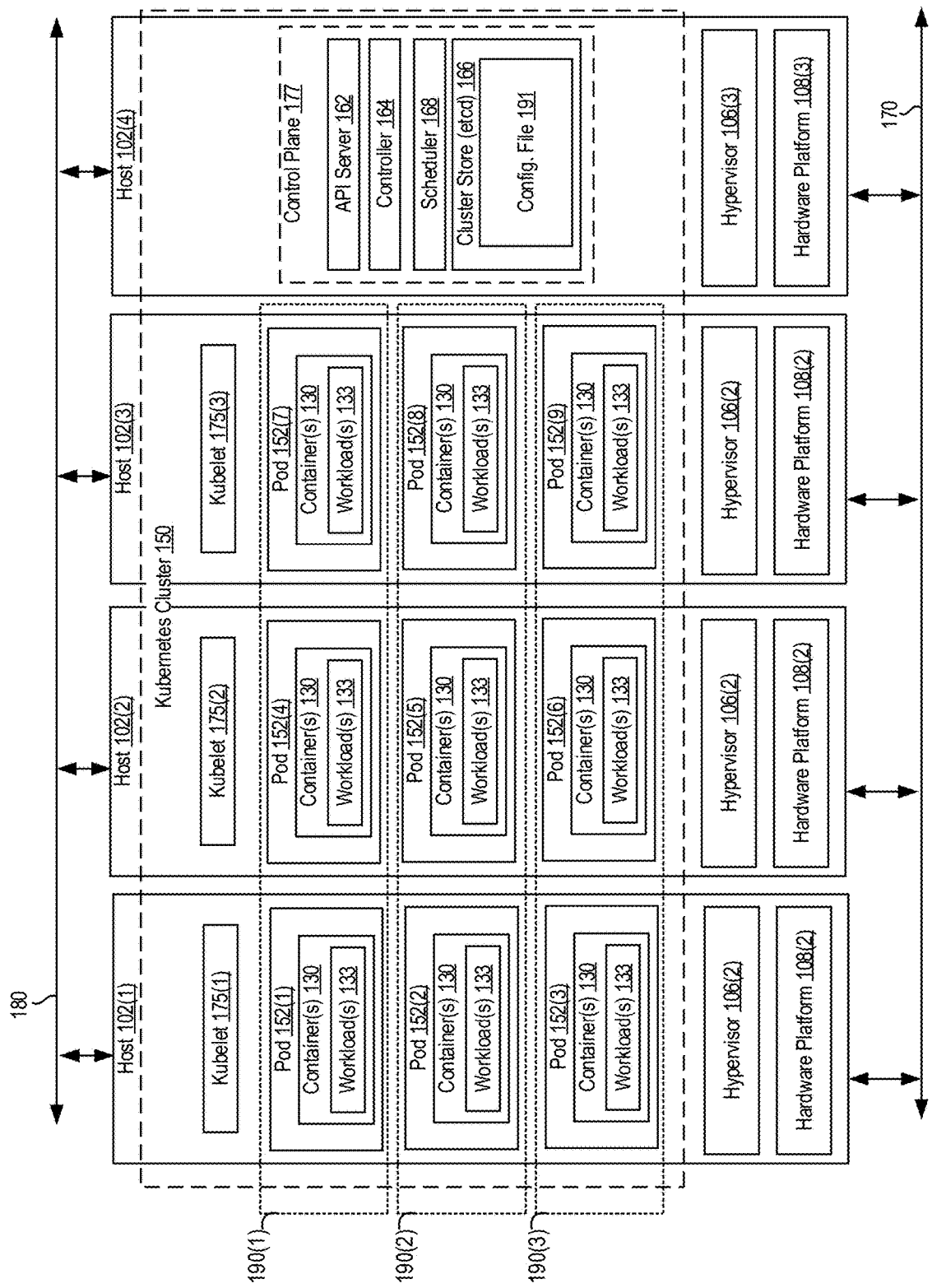
FIG. 1B depicts an example cluster for running containerized workloads in the network environment of FIG. 1A, according to an example embodiment of the present disclosure.

An example container-based cluster for running containerized workloads is illustrated in FIG. 1B. While the example container-based cluster shown in FIG. 1B is a Kubernetes cluster 150, in other examples, the container-based cluster may be another type of container-based cluster based on container technology, such as Docker Swarm clusters.

As illustrated in FIG. 1B, Kubernetes cluster 150 is formed from a combination of one or more pods 152 including one or more containers 130, one or more kubelets 175, and a control plane 177 running on one or more nodes. As described above, a node may be a physical machine, such as a host 102, or a VM 104 (not shown in FIG. 1B) configured to run on a host 102 running a hypervisor 106. The nodes may be a combination of worker nodes (e.g., running pods 152, containers 130, and kubelets 175) and control plane nodes (e.g., running components of control plane 177). For the example Kubernetes cluster 150, the nodes are hosts 102, and more specifically, hosts 102(1), 102(2), and 102(3) are worker nodes while host 102(4) is a control plane node.

Further, although not illustrated in FIG. 1B, Kubernetes cluster 150 may include one or more kube proxies. A kube proxy is a network proxy that runs on each host 102 in Kubernetes cluster 150 that is used to maintain network rules. These network rules allow for network communication with pods 152 from network sessions inside and/or outside of Kubernetes cluster 150.

Pods 152 and/or containers 130 may be organized into one or more namespaces 190 in Kubernetes cluster 150. For example, as illustrated, pods 152(1), 152(4), and 152(7), as well as containers 130 running thereon, belong to a first namespace 190(1), while other pods 152 and containers 130 belong to one of namespace 190(2) or namespace 190(3). Namespaces help to provide API and resource isolation between user workloads 133 in Kubernetes cluster 150.

Kubelet 175 (e.g., on each worker node) is an agent that helps to ensure that one or more pods 152 run on each worker node according to a defined state for the pods 152, such as defined in a configuration file. Each pod 152 may include one or more containers 130.

Control plane 177 (e.g., running on control plane node(s)) includes components such as an API server 162, a cluster store (etcd) 166, controller(s) 164, and scheduler(s) 168. In certain embodiments, control plane 177 further includes a VM operator 194 and/or a network operator 196. Control plane 177's components make global decisions about Kubernetes cluster 150 (e.g., scheduling), as well as detect and respond to cluster events. Control plane 177 manages and controls every component of Kubernetes cluster 150. Control plane 177 handles most, if not all, operations within Kubernetes cluster 150, and its components define and control Kubernetes cluster 150's configuration and state data. Control plane 177 configures and runs the deployment, management, and maintenance of the containerized workloads 133. As such, ensuring high availability of the control plane 177 is important for container deployment and management.

API server 162 operates as a gateway to Kubernetes cluster 150. As such, a command line interface, web user interface, users, and/or services communicate with Kubernetes cluster 150 through API server 162. One example of a Kubernetes API server 162 is kube-apiserver. Instances of kube-apiserver are designed to scale horizontally—that is, this component scales by deploying more instances. Several instances of kube-apiserver may be run, and traffic may be balanced between those instances.

Controller(s) 164 is responsible for running and managing controller processes in Kubernetes cluster 150. For example, control plane 177 may have (e.g., four) control loops called controller processes, that watch the state of Kubernetes cluster 150 and try to modify the current state of Kubernetes cluster 150 to match an intended state of Kubernetes cluster 150. In certain embodiments, controller processes of controller(s) 164 are configured to monitor for changes to the state of Kubernetes cluster 150.

Scheduler(s) 168 is configured to allocate new pods 152 to the worker nodes (e.g., hosts 102). Additionally, scheduler(s) 168 may be configured to distribute workloads 133, across containers 130, pods 152, and/or nodes (e.g., in some cases, hosts 102) that are assigned to use resources of hardware platform 108. Resources may refer to processor resources, memory resources, networking resources, and/or the like. In some cases, scheduler(s) 168 may schedule newly created containers 130 to one or more of the nodes in Kubernetes cluster 150.

Cluster store (etcd) 166 is a data store, such as a consistent and highly-available key value store, used as a backing store for Kubernetes cluster 150 data. In certain embodiments, cluster store (etcd) 166 stores configuration file(s) 191 (e.g., such as JavaScript Object Notation (JSON) or YAML files), made up of one or more manifests or specifications that declare intended system infrastructure and workloads 133 to be deployed in Kubernetes cluster 150. Kubernetes objects, or persistent entities, can be created, updated, and deleted based on configuration file(s) 191 to represent the intended state of Kubernetes cluster 150. There are two categories of objects in Kubernetes that are used to define the state of the cluster: native Kubernetes objects and custom resource (CR) objects, also referred to herein as "custom resources." Native Kubernetes objects may define configurations for pods, services, volumes, namespaces, deployments, replication controllers, and/or the like. These object types are supported and can be created/manipulated by a Kubernetes application programming interface (API). A custom resource, on the other hand, is an object that extends the Kubernetes API or allows a user to introduce their own API into a Kubernetes cluster.

A container-based cluster, such as Kubernetes cluster 150 illustrated in FIG. 1B, may be instantiated in a cloud (e.g., public or private) to run containerized workload(s) 133 for one or more tenants. A public cloud may be a third-party managed platform that uses a standard cloud computing model to make resources and/or services available to remote tenants. Services can include an array of applications including databases, firewalls, load balancers, management tools, networking and security services, and/or the like. Example cloud platforms include VMware vSphere® solution made commercially available by VMware, Inc. of Palo Alto, CA, Amazon Web Services (AWS®) made commercially available by Amazon.com, Inc. of Seattle, Washington, and Google Cloud Platform (GCP®) made commercially available by Google LLC of Mountain View, CA. As used herein, a container-based cluster, deployed on a cloud platform, is referred to as a "data plane."

In some cases, multiple data planes are used to run containerized workloads 133 for a single tenant. Multiple data planes may make up a single multi-cloud environment. An example multi-cloud environment is illustrated in FIG. 2.

Figure 2:
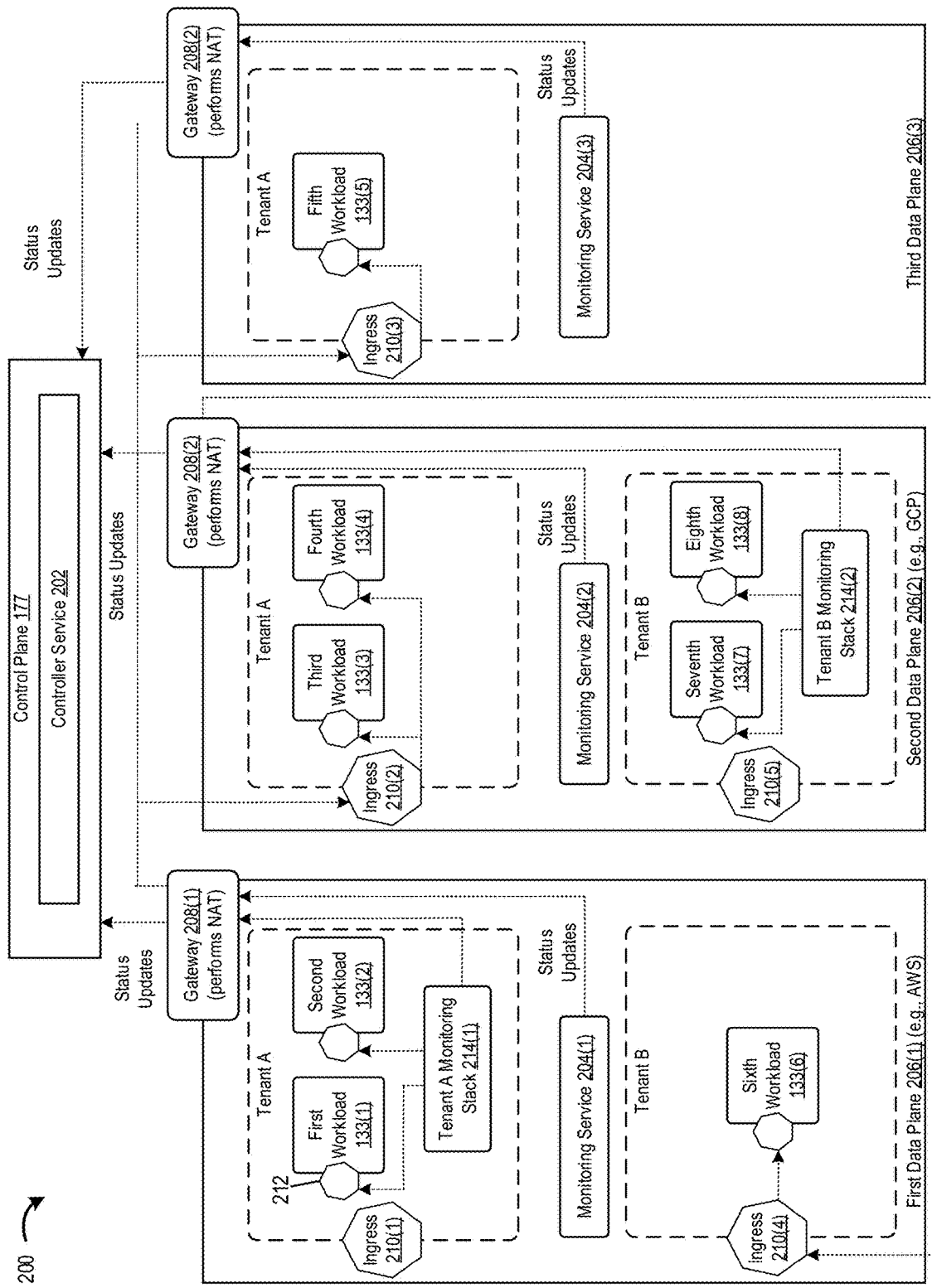
FIG. 2 depicts example centralized monitoring of multiple tenants' workloads in a multi-cloud environment, according to an example embodiment of the present disclosure.

As shown in FIG. 2, the example multi-cloud environment 200 includes three data planes 206. A first data plane 206(1) is a container-based cluster deployed on a first cloud platform, such as AWS, to run containerized workloads 133 for two tenants, namely tenant A and tenant B. A second data plane 206(2) is another container-based cluster deployed on a second cloud platform, such as GCP, to also run containerized workloads 133 for tenants A and B. Further, the third data plane 206(3) is another container-based cluster deployed on a third cloud platform, such as a private/on-premise datacenter, to also run containerized workloads 133 for tenants A and B (although currently only a single workload 133 (e.g., fifth workload 133(5)) for tenant A is running on third data plane 206(3). Currently, per FIG. 2, first data plane 206(1) is running a first workload 133(1) and a second workload 133(2) for tenant A, as well as a sixth workload 133(6) for tenant B. Second data plane 206(2) is running a third workload 133(3) and a fourth workload 133(4) for tenant A, as well as a seventh workload 133(7) and an eighth workload 133(8) for tenant B. Third data plane 206(3) is running a fifth workload 1343(5).

First data plane 206(1), second data plane 206(2), and third data plane 206(3) provide network isolation for workloads 133 on each data plane 206. In particular, each data plane 206 may have its own set of networking features and/or network policies implemented for workloads 133 running thereon. Such decentralized networking makes the collection of metrics data for a tenant's workloads deployed across multiple cloud platforms, to provide a single access point for tenant workload monitoring (e.g., a single dashboard or other visualization that provides visibility for all workloads for a single tenant), a challenging task.

Embodiments described herein overcome the aforementioned technical problems associated with monitoring tenant workloads spread across multiple cloud platforms, by deploying a monitoring stack on a single cloud platform of a multi-cloud environment per tenant. A monitoring stack deployed for a tenant may be configured to collect metrics data from the tenant's workloads deployed on the same cloud platform and/or different cloud platforms as the monitoring stack. More specifically, the monitoring stack may directly address workloads 133 running on the same cloud platform as the monitoring stack using their assigned IP addresses. Further, NAT may be used to allow the monitoring stack to address a tenant's workloads deployed on different cloud platform(s) than the monitoring stack (e.g., via an ingress controller as described in detail below), and thus collect metrics data for each of these workloads. Metrics data collected for these workloads may then be provided, in some cases as a visualization, to the tenant. This data may include information about workload performance, workload resource utilization, bottlenecks, and/or failures such that the tenant is able to more easily (and proactively) manage their workloads in the multi-cloud environment.

In certain embodiments, the monitoring stack deployment is a multi-replica deployment. Specifically, at least two replicas of each monitoring stack associated with each tenant in a multi-cloud environment are deployed on separate nodes of a data plane to provide high-availability and/or fault tolerance for each monitoring stack, to help ensure constant monitoring of tenant workloads in the multi-cloud environment.

FIG. 2 depicts such centralized monitoring of tenant A's workloads and tenant B's workloads deployed in multi-cloud environment 200. For example, in FIG. 2, one monitoring stack 214(1) is deployed for tenant A, specifically on first data plane 206(1). Further, one monitoring stack 214(2) is deployed for tenant B, specifically on second data plane 206(2).

Monitoring stack 214(1) includes a scraping tool used to collect metrics data from first workload 133(1), second workload 133(2), third workload 133(3), fourth workload 133(4), and fifth workload 133(5), and further generate a data-model representation for the collected metrics data. Additionally, monitoring stack 214(2) may include a visualization tool used to generate customized dashboards, alerts, charts, and/or the like using the data-model representation, that may be displayed to tenant A. Similarly, monitoring stack 214(2) includes a scraping tool used to collect metrics data from sixth workload 133(6), seventh workload 133(7), and eighth workload 133(8), and further generate a data-model representation for the collected metrics data. Additionally, monitoring stack 214(2) may include a visualization tool used to generate customized dashboards, alerts, charts, and/or the like using the data-model representation, that may be displayed to tenant B. An example scraping tool of monitoring stack 214(1) and/or monitoring stack 214(2) includes Prometheus® made available by SoundCloud Global Limited & Co. KG, doing business as SoundCloud, of Berlin, Germany. Further, an example visualization tool of monitoring stack 214(1) and/or monitoring stack 214(2) includes Grafana® made commercially available by Grafana Labs (formerly known as "Raintank") of New York City, NY.

Deploying a monitoring stack 214 per tenant helps to maintain isolation between metrics data of various tenants (e.g., for security and/or confidentiality). For example, first monitoring stack 214(1) deployed for tenant A is configured to collect metrics data for only tenant A's workloads 133 while, second monitoring stack 214(2) deployed for tenant B is configured to collect metrics for only tenant B's workloads 133.

Monitoring stack 214(1) is able to directly address first workload 133(1) and second workload 133(2) for the collection of metrics data from these workloads using their assigned private IP addresses (e.g., service endpoints 212, which are addresses that monitoring stack(s) 214 may gain access to). However, to obtain metrics data from third workload 133(3), fourth workload 133(4), and fifth workload 133(5), outside of first data plane 206(1), monitoring stack 214(1) may send requests for the collection of metrics data (e.g., as network packets) to ingress controller 210(2) (e.g., associated with third workload 133(3) and fourth workload 133(4)) and ingress controller 210(3) (e.g., associated with fifth workload 133(5)). Specifically, NAT, at the gateway 208(1) of first data plane 206(1), may be used to translate a private IP address associated with monitoring stack 214(1) to a corresponding public IP address, for the transmission of requests (e.g., as packets) to ingress controller 210(2) and/or ingress controller 210(3). Ingress controllers 210(2) and 210(3) may each maintain a network policy allow list having one or more IP addresses, indicating that packets received from these IP addresses are allowed. Thus, in this example, ingress controllers 210(2) and 210(3) may each have lists configured with at least the public IP address(es) associated with monitoring stack 214(1), such that packets received from monitoring stack 214(1) are allowed, and can be forwarded to third workload 133(3), fourth workload 133(4), and/or fifth workload 133(5), at least for the collection of metrics data.

Figure 3:
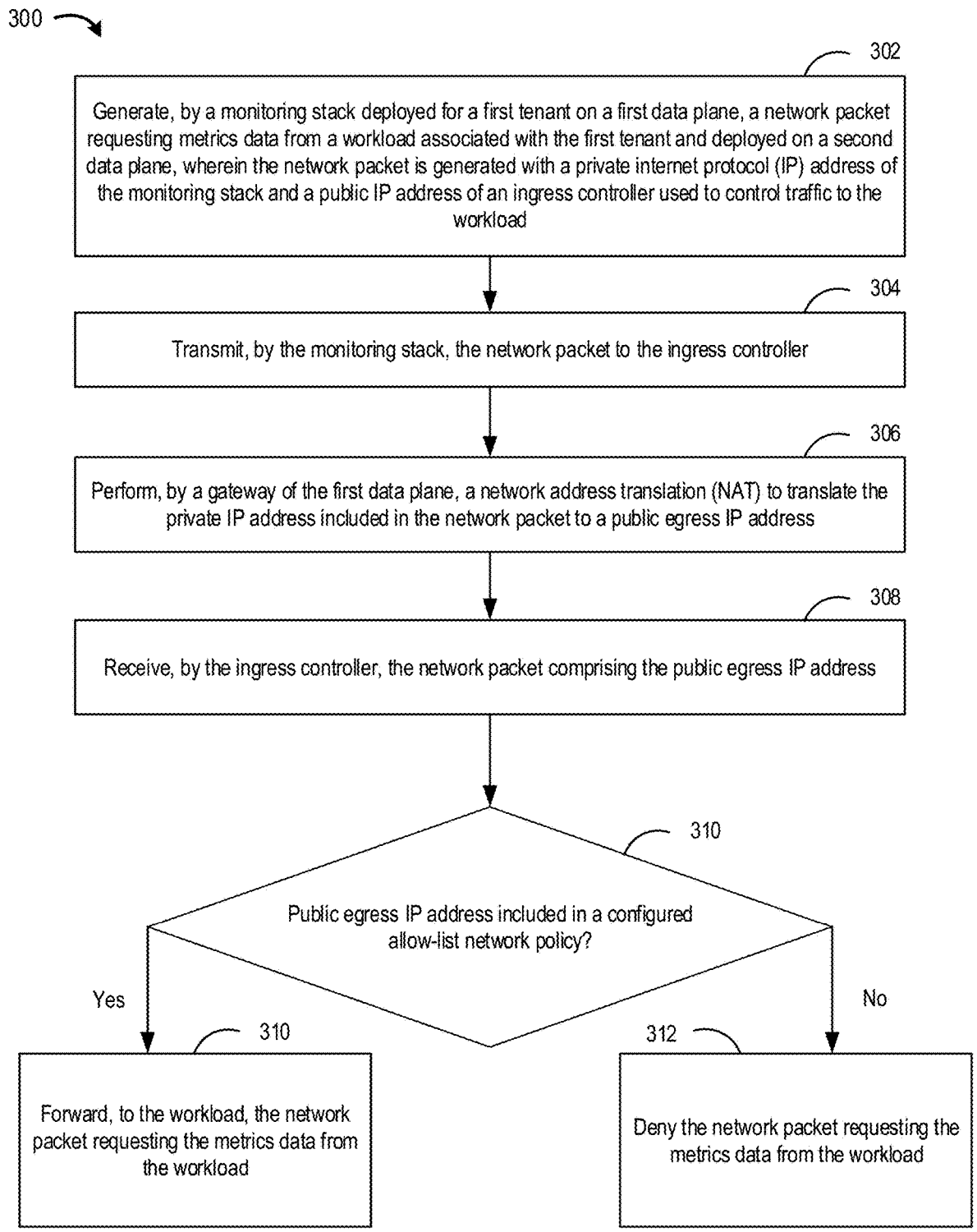
FIG. 3 is an example workflow for obtaining workload metrics in a multi-cloud environment.

FIG. 3 is an example workflow 300 for obtaining workload metrics data in a multi-cloud environment. For example, workflow 300 may be performed such that monitoring stack 214(1) on first data plane 206(1) obtains metrics data from third workload 133(3) on second data plane 206(2) in FIG. 2. Although not meant to be limiting to this particular example, workflow 300 is described below for using this example scenario.

Workflow 300 begins, at step 302, with, a monitoring stack deployed for a first tenant on a first data plane, generating a network packet requesting metrics data from a workload associated with the first tenant and deployed on a second data plane. For example, in FIG. 2, monitoring stack 214(1) generates a network packet requesting metrics data from third workload 133(3). The network packet may be generated to include as a source IP address the IP address of monitoring stack 214(1) (e.g., private IP address assigned to monitoring stack 214(1)) and as a destination IP address the IP address of an ingress controller, deployed on second data plane 206(2), used to control traffic to third workload 133(3) (e.g., a public IP address assigned to ingress controller 210(2)). Further, the network packet may be generated to include a HostName unique to third workload 133(3) indicating that the ingress controller is to route the network packet to third workload 133(3) after receiving the network packet.

Workflow 300 proceeds, at step 304, with the monitoring stack transmitting the generated network packet to the ingress controller. For example, in FIG. 2, monitoring stack 214(1) transmits the network packet to ingress controller 210(2) to obtain metrics data from third workload 133(3).

Transmission of the network packet to ingress controller involves transmitting the packet outside of the first data plane via a gateway of the first data plane and ingestion of the packet inside the second data plane via a gateway (e.g., a non-NAT gateway, such as a datacenter gateway or cloud-provider specific gateway) of the second data plane. The gateway of the first data plane may need to perform source NAT to translate the private IP address of the monitoring stack to a public IP address. For example, at step 306 in workflow 300, the gateway of the first data plane performs source NAT to translate the private IP address included in the network packet to a public egress IP address (e.g., of the gateway of the first data plane)

After NAT is performed by the gateway of the first data plane, the network packet is forwarded to the ingress controller through the gateway of the second data plane (e.g., different gateway than gateway 208(2), not shown in FIG. 2). Thus, at step 308, the ingress controller receives the network packet comprising the public egress IP address The network packet further includes the HostName of third workload 133(3), as described above.

Workflow 300 then proceeds, at step 310, with the ingress controller determining whether the public egress IP address is included in a network policy allow list maintained by the ingress controller. If the IP address is included in network policy allow list, then the ingress controller allows ingress of the network packet to the workload at step 310. Alternatively, if the IP address is not included in the network policy allow list, then the ingress controller denies the network packet requesting the metrics data from the workload.

For example, in FIG. 2, at step 310, ingress controller 210(2) determines whether the public egress IP address of first data plane 206(1) is included in a network policy allow list maintained by ingress controller 210(2). In this example, the public egress IP address is expected to be included in the network policy allow list given when third workload 133(3) and/or fourth workload 133(4) was deployed on second data plane 206(2), and further ingress controller 210(2) was deployed, the network policy allow list maintained by ingress controller 210(2) would have been updated to include this IP address to enable monitoring stack 214(1) to obtain metrics data from these workloads 133 (e.g., described in more detail below with respect to FIG. 4). As such, at step 310, ingress controller 210(2) may determine that the public egress IP address is included in the network policy allow list and forward the network packet to third workload 133(3) (as well as fourth workload 133(4), which ingress controller 210(2) also manages ingress traffic for). Ingress controller 210(2) determines to route the network packet to third workload 133(3) based on the HostName for third workload 133(3) included in the network packet.

Returning to FIG. 2, monitoring stack 214(2) is able to directly address seventh workload 133(7) and eighth workload 133(8), belonging to tenant B, for the collection of metrics data from these workloads using their assigned private IP addresses (e.g., service endpoints 212). However, to obtain metrics data from sixth workload 133(6), outside of second data plane 206(2), monitoring stack 214(2) may send requests for the collection of metrics data (e.g., as network packets) to ingress controller 210(4) (e.g., associated with sixth workload 133(6)). Transmission of packets to ingress controller 210(4) may follow similar steps as those outlined above with respect to workflow 300 in FIG. 3.

Tenants and/or workloads 133 in multi-cloud environment 200 may be constantly changing. Accordingly, it may be important to track such changes such that (1) new monitoring stacks 214 are deployed when new tenants, and their corresponding workloads 133, are added to environment 200, (2) existing monitoring stacks are removed when tenants, and all their corresponding workloads 133, are removed from environment 200, (3) configurations at existing monitoring stacks 214 are updated when workloads 133 are added, deleted, scaled-up (e.g., workload instances are increased), and/or scaled-down (e.g., workload instances are decreased), and (4) network policy allow lists are created/updated when new workloads 133 deployed.

To track changes to workloads 133 and/or tenants in multi-cloud environment 200, a controller service 202 and multiple monitoring services 204 are deployed. In particular, controller service 202 is deployed on a control plane 177 on a control plane node of a data plane separate from first data plane 206(1), second data plane 206(2), or third data plane 206(3). Further, a first monitoring service 204(1) is deployed on first data plane 206(1), a second monitoring service 204(2) is deployed on data plane 206(2), and a third monitoring service 204(3) is deployed on third data plane 206(3).

Controller service 202 is responsible for keeping track of all running tenant workloads 133, and their exposed service endpoints 212, as well as public egress IP addresses of data planes 206 in multi-cloud environment 200. Further, controller service 202 is responsible for monitoring changes to tenants and/or workloads 133 of multi-cloud environment such that necessary configurations and/or network policy lists may be automatically updated. Automatic updates in response to changes in environment 200 allows for continuous communication between monitoring stack(s) 214 and workload(s) 133 deployed in environment 200 to allow for continuous monitoring of metrics data.

Controller service 202 may rely on status updates from first monitoring service 204(1), second monitoring service 204(2), and/or third monitoring service 204(3) to monitor for changes in multi-cloud environment. In particular, each monitoring service 204 is deployed on a single data plane 206 and is responsible for determining the current state of workloads 133 deployed on the respective data plane and sending this information, as status updates, to controller service 202. Controller service 202 may perform one or more actions based on the received status updates from monitoring service 204(1), 204(2), and/or 204(3) to enable continuous monitoring of tenant workload metrics.

Figure 4:
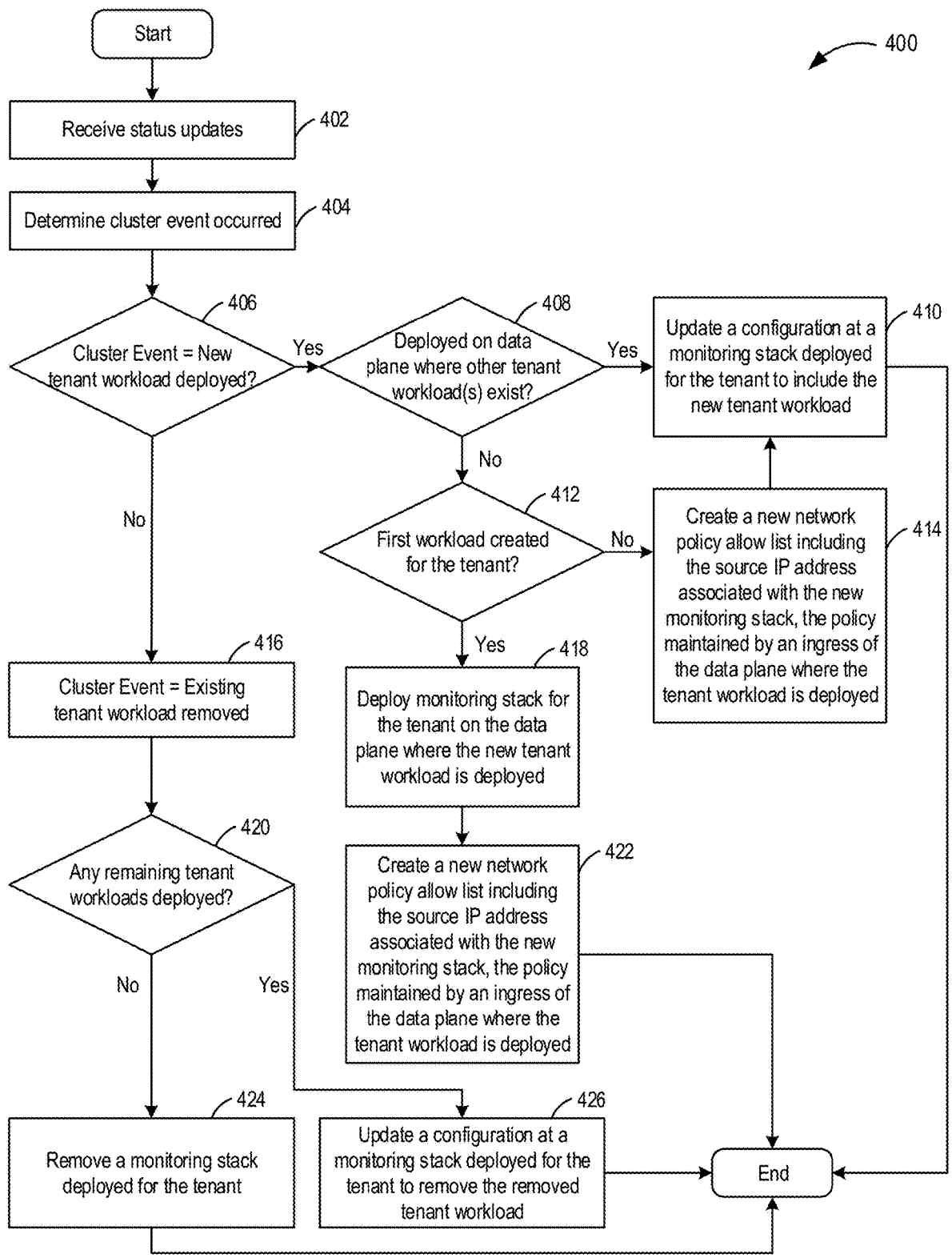
FIG. 4 is an example workflow for managing communication between a centralized controller and tenant workloads in a multi-cloud environment.

FIG. 4 is an example workflow 400 for managing communication between a centralized monitoring stack, deployed for a tenant, and the tenant's workloads in a multi-cloud environment to enable continuous monitoring of metrics for the tenant workloads.

Workflow 400 begins at step 402, with a controller service receiving status updates from one or more monitoring services. For example, step 402 may include controller service 202 receiving status updates from first monitoring service 204(1) deployed on first data plane 206(1), second monitoring service 204(2) deployed on second data plane 206(2), and/or third monitoring service 20493) deployed on third data plane 206(3).

Based on receiving the status updates, the controller service may determine, at step 404, that a cluster event has occurred. Cluster events may include a new tenant workload 133 being deployed, an existing tenant workload 133 being removed, an existing tenant workload 133 being horizontally scaled-up, an existing tenant workload being horizontally scaled-down, etc. For example, based on receiving a status update from third monitoring service 204(3) indicating that a new workload 133 has been deployed for tenant A, controller service 202 determines that the creation and deployment of a new workload (e.g., a cluster event) has occurred on third data plane 206(3) for tenant A.

To determine what actions are needed to update configuration(s) and/or create network policy allow list(s) in the multi-cloud environment managed by the controller service, workflow 400 proceeds, to step 406, with the controller service determining whether the cluster event is the deployment of a new tenant workload on a data plane in the multi-cloud environment. In some cases, deployment of a new tenant workload refers to a scenario where a number of replicas for an existing workload is increased (e.g., scaling up). For example, a particular workload may have several copies/instances instantiated, such as for parallelization or load balancing.

If a new tenant workload has been deployed, then at step 408, the controller service determines whether the new tenant workload is deployed on a data plane where other workload(s) for same the tenant exist. For example, if the new tenant workload is a workload 133 deployed for tenant A on third data plane 206(3) in FIG. 2, controller service 202 would determine, at step 408, that one workload for tenant A (e.g., fifth workload 133(5)) already exists on third data plane 206(3).

If, at step 408, the controller service determines that the new tenant workload is deployed on a data plane where other workload(s) for the same tenant exist, then at step 410, the controller service updates a configuration at a monitoring stack, previously deployed for this tenant on one of the data planes in the multi-cloud environment, to include the new tenant workload. In the above example, if the new workload for tenant A is deployed on third data plane 206(3) in FIG. 2, then controller service 202 updates a configuration of monitoring stack 214(1), deployed on first data plane 206(1) for tenant A, to include the new workload for tenant A. Updating the configuration of monitoring stack 214(1) informs monitoring stack 214(1) about the new workload such monitoring stack 214(1) is able to access this new workload and thus begin collecting metrics data for the new workload.

Alternatively, if, at step 408, the controller service determines that the new tenant workload is not deployed on a data plane where other workload(s) for the same tenant exist, then at step 412, the controller service determines whether the new workload is a first workload deployed for the tenant in the multi-cloud environment (i.e., this tenant is a new tenant of the multi-cloud environment because they don't currently have any existing workloads deployed and running therein).

If, at step 412, the controller service determines the new workload is not a first workload deployed for the tenant in the multi-cloud environment, and thus is just another workload for the tenant deployed on a data plane where only other workload(s) for other tenant(s) are deployed, then workflow 400 proceeds to step 414. At step 414, the controller service creates a new network policy allow list for the tenant which is to be maintained by an ingress controller on the data plane where the new workload is deployed (e.g., to control ingress traffic to the new workload). The new network policy allow list may include (1) a source IP address associated with a data plane where a monitoring stack of the tenant was previously deployed or (2) a source IP address associated with a gateway of the data plane where the monitoring stack of the tenant was previously deployed. The ingress controller may be used to control traffic to the new workload. As such, to allow the monitoring stack, associated with the tenant and deployed on a different data plane, to communicate with the new tenant workload, then the network policy needs to include one of the two IP addresses to allow such traffic (e.g., network packet(s)) from the monitoring stack. The network policy, including one of these IP addresses, will enable ingress traffic from the monitoring stack to the new tenant workload. Further, at step 410, the controller service updates a configuration at the monitoring stack to include the new tenant workload.

Alternatively, if, at step 412, the controller service determines the new tenant workload is a first workload deployed for the tenant in the multi-cloud environment, then, at step 418, the controller service deploys a monitoring stack for the tenant on the data plane where the new tenant workload is deployed. For example, in FIG. 2, if a new workload 133 is deployed for a new tenant C on third data plane 206(3) in multi-cloud environment 200, then controller service 202 initiates the deployment of a monitoring stack 214(3) for tenant C on third data plane 206(3). Further, at step 422, the controller service creates a new network policy allow list for the new tenant which is to be maintained by an ingress controller on the data plane where the new tenant workload is deployed (e.g., to control ingress traffic to the new tenant workload).

Returning to step 406, if the controller service determines that the cluster event is not related to the deployment of a new tenant workload, then at step 416, the controller service determines that the cluster event is related to the removal of an existing workload of an existing tenant in the multi-cloud environment. In some cases, removal of an existing workload refers to a scenario where a number of replicas for an existing workload is decreased (e.g., scaling down). Thus, at step 420, the cluster service determines whether there are any remaining workloads deployed for the tenant associated with the workload that was removed. For example, the tenant may have only had one workload running in the multi-cloud environment, thus removal of the workload would result in the tenant not having any running workloads in the environment.

If, at step 420, the controller service determines that there are no remaining workloads deployed and running in the multi-cloud environment for the tenant, then, at step 424, the controller service removes a monitoring stack previously deployed on a data plane in the multi-cloud environment for the tenant to monitor workload(s) for the tenant. The monitoring stack may be removed given there are no workloads for the tenant to monitor (and, as described above, a monitoring stack is specific to only a single tenant and their workload(s)). If the workload that was removed was a workload running on a different data plane than a data plane where the monitoring stack (e.g., associated with the same tenant), then step 420 further includes removing an ingress controller deployed on the data plane where the workload was running (as well as the network policy created for the ingress controller).

Alternatively, if, at step 420, the controller service determines that there are one or more remaining workloads deployed and running in the multi-cloud environment for the tenant, then, then the controller service determines to keep the monitoring stack previously deployed for the tenant and, at step 426, updates a configuration at the monitoring stack to remove the removed tenant workload.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

The invention claimed is:

1. A method for monitoring tenant workloads in a multi-cloud environment, comprising:
   determining a first new workload for a first tenant is deployed on a first data plane associated with a first cloud platform in the multi-cloud environment;
   configuring a monitoring stack on a second data plane associated with a second cloud platform in the multi-cloud environment to collect first metrics data for the first new workload; and
   creating a network policy allow list including a source internet protocol (IP) address associated with the monitoring stack, wherein the network policy allow list is to be used by an ingress controller deployed on the first data plane to control ingress traffic to the first new workload, including at least ingress traffic from the monitoring stack intended for the first new workload.

2. The method of claim 1, further comprising, prior to determining the first new workload for the first tenant is deployed on the first data plane:
   determining a second new workload for the first tenant is deployed on the second data plane;
   deploying the monitoring stack on the second data plane for the first tenant based on the second new workload being a first workload in time deployed for the first tenant in the multi-cloud environment; and
   configuring the monitoring stack to collect second metrics data for the second new workload.

3. The method of claim 2, further comprising after creating the network policy allow list including the source IP:
   determining the first new workload deployed on the first data plane and the second new workload deployed on the second data plane have been removed; and
   removing the monitoring stack deployed on the second data plane based on the first new workload and the second new workload for the first tenant being removed.

4. The method of claim 2, further comprising after creating the network policy allow list including the source IP:
   determining the first new workload deployed on the first data plane has been removed; and
   configuring the monitoring stack on the second data plane to stop collecting the first metrics data for the first new workload.

5. The method of claim 1, further comprising, after creating the network policy allow list including the source IP:
   determining a third new workload for the first tenant is deployed on the first data plane; and
   configuring the monitoring stack on the second data plane associated with the second cloud platform to collect third metrics data for the third new workload based on the third new workload for the first tenant being deployed on the same first data plane as the first new workload.

6. The method of claim 1, further comprising:
   determining a third new workload for a second tenant is deployed on the first data plane associated with the first cloud platform in the multi-cloud environment;
   deploying a second monitoring stack on the first data plane for the second tenant based on the third new workload being a first workload in time deployed for the second tenant in the multi-cloud environment; and
   configuring the second monitoring stack to collect second metrics data for the third new workload.

7. The method of claim 1, wherein a controller service deployed on a control plane node associated with the first cloud platform or another could platform in the multi-cloud environment determines the first new workload for the first tenant is deployed on the first data plane based on one or more status updates received from a monitoring service deployed on the first data plane.

8. A system comprising:
   one or more processors; and
   at least one memory, the one or more processors and the at least one memory configured to:
      determine a first new workload for a first tenant is deployed on a first data plane associated with a first cloud platform in a multi-cloud environment;
      configuring a monitoring stack on a second data plane associated with a second cloud platform in the multi-cloud environment to collect first metrics data for the first new workload; and
      create a network policy allow list including a source internet protocol (IP) address associated with the monitoring stack, wherein the network policy allow list is to be used by an ingress controller deployed on the first data plane to control ingress traffic to the first new workload, including at least ingress traffic from the monitoring stack intended for the first new workload.

9. The system of claim 8, wherein the one or more processors and the at least one memory are further configured to, prior to determining the first new workload for the first tenant is deployed on the first data plane:
   determine a second new workload for the first tenant is deployed on the second data plane;
   deploy the monitoring stack on the second data plane for the first tenant based on the second new workload being a first workload in time deployed for the first tenant in the multi-cloud environment; and
   configure the monitoring stack to collect second metrics data for the second new workload.

10. The system of claim 9, wherein the one or more processors and the at least one memory are further configured to, after creating the network policy allow list including the source IP:
    determine the first new workload deployed on the first data plane and the second new workload deployed on the second data plane have been removed; and
    remove the monitoring stack deployed on the second data plane based on the first new workload and the second new workload for the first tenant being removed.

11. The system of claim 9, wherein the one or more processors and the at least one memory are further configured to, after creating the network policy allow list including the source IP:
    determine the first new workload deployed on the first data plane has been removed; and
    configure the monitoring stack on the second data plane to stop collecting the first metrics data for the first new workload.

12. The system of claim 8, wherein the one or more processors and the at least one memory are further configured to, after creating the network policy allow list including the source IP:
    determine a third new workload for the first tenant is deployed on the first data plane; and
    configure the monitoring stack on the second data plane associated with the second cloud platform to collect third metrics data for the third new workload based on the third new workload for the first tenant being deployed on the same first data plane as the first new workload.

13. The system of claim 8, wherein the one or more processors and the at least one memory are further configured to:
  determine a third new workload for a second tenant is deployed on the first data plane associated with the first cloud platform in the multi-cloud environment;
  deploy a second monitoring stack on the first data plane for the second tenant based on the third new workload being a first workload in time deployed for the second tenant in the multi-cloud environment; and
  configure the second monitoring stack to collect second metrics data for the third new workload.

14. The system of claim 8, wherein a controller service deployed on a control plane node associated with the first cloud platform or another could platform in the multi-cloud environment determines the first new workload for the first tenant is deployed on the first data plane based on one or more status updates received from a monitoring service deployed on the first data plane.

15. A non-transitory computer-readable medium comprising instructions that, when executed by one or more processors of a computing system, cause the computing system to perform operations for monitoring tenant workloads in a multi-cloud environment, the operations comprising:
  determining a first new workload for a first tenant is deployed on a first data plane associated with a first cloud platform in the multi-cloud environment;
  configuring a monitoring stack on a second data plane associated with a second cloud platform in the multi-cloud environment to collect first metrics data for the first new workload; and
  creating a network policy allow list including a source internet protocol (IP) address associated with the monitoring stack, wherein the network policy allow list is to be used by an ingress controller deployed on the first data plane to control ingress traffic to the first new workload, including at least ingress traffic from the monitoring stack intended for the first new workload.

16. The non-transitory computer-readable medium of claim 15, wherein the operations further comprise, prior to determining the first new workload for the first tenant is deployed on the first data plane:
  determining a second new workload for the first tenant is deployed on the second data plane;
  deploying the monitoring stack on the second data plane for the first tenant based on the second new workload being a first workload in time deployed for the first tenant in the multi-cloud environment; and
  configuring the monitoring stack to collect second metrics data for the second new workload.

17. The non-transitory computer-readable medium of claim 16, wherein the operations further comprise, after creating the network policy allow list including the source IP:
  determining the first new workload deployed on the first data plane and the second new workload deployed on the second data plane have been removed; and
  removing the monitoring stack deployed on the second data plane based on the first new workload and the second new workload for the first tenant being removed.

18. The non-transitory computer-readable medium of claim 16, wherein the operations further comprise, after creating the network policy allow list including the source IP:
  determining the first new workload deployed on the first data plane has been removed; and
  configuring the monitoring stack on the second data plane to stop collecting the first metrics data for the first new workload.

19. The non-transitory computer-readable medium of claim 15, wherein the operations further comprise, after creating the network policy allow list including the source IP:
  determining a third new workload for the first tenant is deployed on the first data plane; and
  configuring the monitoring stack on the second data plane associated with the second cloud platform to collect third metrics data for the third new workload based on the third new workload for the first tenant being deployed on the same first data plane as the first new workload.

20. The non-transitory computer-readable medium of claim 15, wherein the operations further comprise:
  determining a third new workload for a second tenant is deployed on the first data plane associated with the first cloud platform in the multi-cloud environment;
  deploying a second monitoring stack on the first data plane for the second tenant based on the third new workload being a first workload in time deployed for the second tenant in the multi-cloud environment; and
  configuring the second monitoring stack to collect second metrics data for the third new workload.

* * * * *